US007142255B2

(12) United States Patent
Nohrden

(10) Patent No.: US 7,142,255 B2
(45) Date of Patent: Nov. 28, 2006

(54) TRANSPORT STREAM AND CHANNEL SELECTION SYSTEM FOR DIGITAL VIDEO RECEIVER SYSTEMS AND ASSOCIATED METHOD

(75) Inventor: James M. Nohrden, Lakeway, TX (US)

(73) Assignee: Silicon Laboratories Inc., Austin, TX (US)

( * ) Notice: Subject to any disclaimer, the term of this patent is extended or adjusted under 35 U.S.C. 154(b) by 529 days.

(21) Appl. No.: 10/681,011

(22) Filed: Oct. 8, 2003

(65) Prior Publication Data

US 2005/0078757 A1 Apr. 14, 2005

(51) Int. Cl.
*H04N 5/44* (2006.01)
*H04N 5/445* (2006.01)

(52) U.S. Cl. ........................ 348/725; 348/731; 725/38

(58) Field of Classification Search ............... 348/731, 348/732, 735, 725, 553, 705, 706, 554; 725/152, 725/132, 140, 37, 38; 455/180.1, 182.1, 455/185.1, 186.1, 187.1, 191.1
See application file for complete search history.

(56) References Cited

U.S. PATENT DOCUMENTS 5,594,492 A 1/1997 O'Callaghan et al.
5,933,192 A 8/1999 Crosby et al.
6,016,172 A * 1/2000 Huh ..................... 375/240.27
6,118,498 A 9/2000 Reitmeier
6,334,217 B1 12/2001 Kim
6,519,011 B1 2/2003 Shendar
6,542,203 B1 4/2003 Shadwell et al.
6,591,013 B1 7/2003 Taunton
6,714,264 B1 * 3/2004 Kempisty .................. 348/732
6,714,776 B1 * 3/2004 Birleson .................... 455/302
6,804,824 B1 * 10/2004 Potrebic et al. .............. 725/38
6,927,806 B1 * 8/2005 Chan ......................... 348/731
6,985,188 B1 * 1/2006 Hurst, Jr. ................... 348/553
2001/0022631 A1 * 9/2001 Scheffler et al. ........... 348/731
2002/0067438 A1 6/2002 Baldock
2003/0053562 A1 * 3/2003 Busson et al. ............. 375/322
2003/0091115 A1 5/2003 Yamana et al.
2003/0226153 A1 * 12/2003 Bessel et al. .............. 725/152
2004/0001500 A1 * 1/2004 Castillo ..................... 370/437
2004/0111741 A1 * 6/2004 DePietro ..................... 725/34
2004/0189879 A1 * 9/2004 Read ......................... 348/731
2005/0273830 A1 * 12/2005 Silver et al. ............... 725/105

FOREIGN PATENT DOCUMENTS

EP 1317073 A1 * 6/2001

* cited by examiner

*Primary Examiner*—Victor R. Kostak
(74) *Attorney, Agent, or Firm*—O'Keefe, Egan & Peterman, LLP

(57) ABSTRACT

A transport stream and channel selection system for digital video transmissions and associated method are disclosed that use predictive analyses to tune additional digital transport streams that contain desirable or optimal groupings of multiplexed channels. An analysis is made of which channels are multiplexed together at any given time to determine which transport streams provide a desirable and/or optimal combination of multiplexed channels, and a wide variety of information and algorithms can be used in determining the transport streams and channels to select. Thus, in addition to having available the channels multiplexed with the currently selected channel, a plurality of other channels multiplexed together in additional digital transport streams are made available for pre-processing. As such, the available channels for use in providing predictive pre-selection and for use in reducing delay experienced by a user in changing channels are greatly enhanced.

20 Claims, 2 Drawing Sheets

TRANSPORT STREAM AND CHANNEL SELECTION SYSTEM FOR DIGITAL VIDEO RECEIVER SYSTEMS AND ASSOCIATED METHOD

TECHNICAL FIELD OF THE INVENTION

This invention relates to receiver system architectures for digital television and more particularly to architectures for selecting program channel information within digital video broadcasts.

BACKGROUND

Conventional home satellite television systems utilize a fixed dish antenna to receive satellite communications. After receiving the satellite signal, the dish antenna circuitry sends a satellite spectrum signal to a satellite receiver or set-top box that is often located near a television through which the viewer desires to watch the satellite programming. This satellite receiver uses receive path circuitry to tune the program channel that was selected by the user. Throughout the world, the satellite channel spectrum sent to the set-top box is often structured to include 32 transponder channels between 950 MHz and 2150 MHz with each transponder channel carrying a number of different program channels. Each transponder will typically transmit multiple program channels that are time-multiplexed on one carrier signal. Alternatively, the multiple program channels may be frequency multiplexed within the output of each transponder. The total number of received program channels considering all the transponder channels together is typically well over 300 program channels. In a somewhat similar fashion, digital cable and digital terrestrial television broadcasts utilize carrier signals that carry information for digital transport streams that often include multiplexed program channels. In addition to having the ability to tune to these carrier signals, certain existing digital television receivers have multiple tuners that allow for multi-tuner functionality, such as personal video recorder (PVR) functions, picture-in-picture (PiP) functions, and different channel viewing on two televisions.

With respect to the digital transport streams, compression techniques are often utilized. One example of a common compression technique for digital video transmissions is the MPEG2 video compression standard. For digital video broadcasts using MPEG2 compression, data for a plurality of channels are time-multiplexed onto a single transport stream. For satellite digital video broadcasts, each of the MPEG2 transport streams often correlates to a transponder channel, as discussed above. And the satellite broadcaster will select and modify in real-time the channels included within each transport stream based upon the amount of data each channel is requiring to be sent. For example, transmissions correlating to a news broadcast often require relatively low amounts of data because the scenes typically do not change significantly. In contrast, transmissions correlating to sporting events often require relatively large amounts of data because the video scenes are constantly changing at a fast rate. And within a single program, the data flow requirements may vary significantly depending upon the image scenes being broadcast. Thus, the satellite broadcaster, as well as broadcasters of other types of digital video transmissions (e.g., digital cable, digital terrestrial), will typically analyze the current data flow requirements of its programs and attempt to optimize its transport streams by adjusting which channels are multiplexed with which other channels.

Although the wide variety of program channels is a desirable feature of digital television, users often experience delays of several seconds when switching from one program channel to the next. This delay is due to the nature of the digital video transmissions, such as those that use MPEG2 compression techniques. For the MPEG2 standard and other compression standards, a series of data frames are sent. The first frame essentially represents the full frame of the video image that will be displayed and is commonly referred to as an I-frame. This I-frame serves to initialize the video image and is typically transmitted at the beginning of each video scene. After the I-frame is transmitted, a number of additional frames will be transmitted that represent only the difference between the I-frame and the next frame and then between the previous frame and the next frame. These difference frames are commonly referred to as B-frames. Because B-frames contain only difference information, if a channel is accessed while B-frames are being received, a complete image cannot be displayed until a new I-frame is received.

The delay in time between a user accessing a channel and the receipt of the next I-frame creates the potential delay of several seconds. The length of this delay will often depend upon the digital video encoder settings that are being utilized by the broadcaster. For example, if a user is changing channels and happens to change to a channel where the I-frame was recently sent and the video contains a relatively static scene with few changes, the user will likely have to wait for the next I-frame to appear before a full picture can be viewed. As indicated above, this time delay between I-frames can be uncomfortably long, on the order of seconds. Thus, due to the use of compression algorithms, such as MPEG2, digital television typically suffers from slow channel-changing resolution times.

A number of solutions have been proposed to reduce the delay experienced due to gaps in I-frame information. Proposed techniques for reducing this delay have focused on predicting one or more channels that a user is likely to move to next and then tuning, demodulating and decoding these predicted channels. In this way, a plurality of channels has already been decoded and is available through this predictive selection process. If a user moves next to one of these predicted channels, the channel changing time delay can be significantly reduced. Examples of such systems are described in U.S. Pat. Nos. 5,933,192, 6,118,498 and 6,519,011, each of which is hereby incorporated by reference in its entirety. Another technique has been proposed to use extra processing power in the decoder to decode channels in addition to the currently selected channel that have been multiplexed within the same digital transport stream. One problem with this solution, however, is that the channels bundled in the same transport stream may not represent channels that are likely to be selected next by the user, and, therefore, the processing power used to decode these channels would be wasted. An example of such a system is described in U.S. Pat. No. 6,591,013, which is hereby incorporated by reference in its entirety.

SUMMARY OF THE INVENTION

The present invention is a transport stream and channel selection system for digital video transmissions and associated method that use predictive analyses to tune additional digital transport streams that contain a desirable or optimal grouping of multiplexed channels. An analysis is made of which channels are multiplexed together at any given time to determine which transport streams provide a desirable and/or optimal combination of multiplexed channels, and a wide variety of information and algorithms can be used in determining the transport streams and channels to select. Thus, in addition to having available the channels multiplexed with the currently selected channel, the present invention allows for a plurality of other channels multiplexed together in additional digital transport streams to be available for pre-processing. As such, the available channels for use in providing predictive selection and for use in reducing delay experienced by a user in changing channels are greatly enhanced.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides a multi-tuner receiver system that allows for a reduction in the amount of time experienced by users of digital video transmissions when changing between channels. The present invention takes advantage of additional and potentially unused tuners within a multi-tuner receiver system to tune and demodulate additional digital video transport streams and to decode preselected channels within those transport streams. Predictive algorithms are used to determine channels that are likely to be selected next and to determine which transport streams include a desirable or optimal combination of multiplexed channels. Additional transport streams are selected and processed based upon this predictive analysis.

Figure 1:
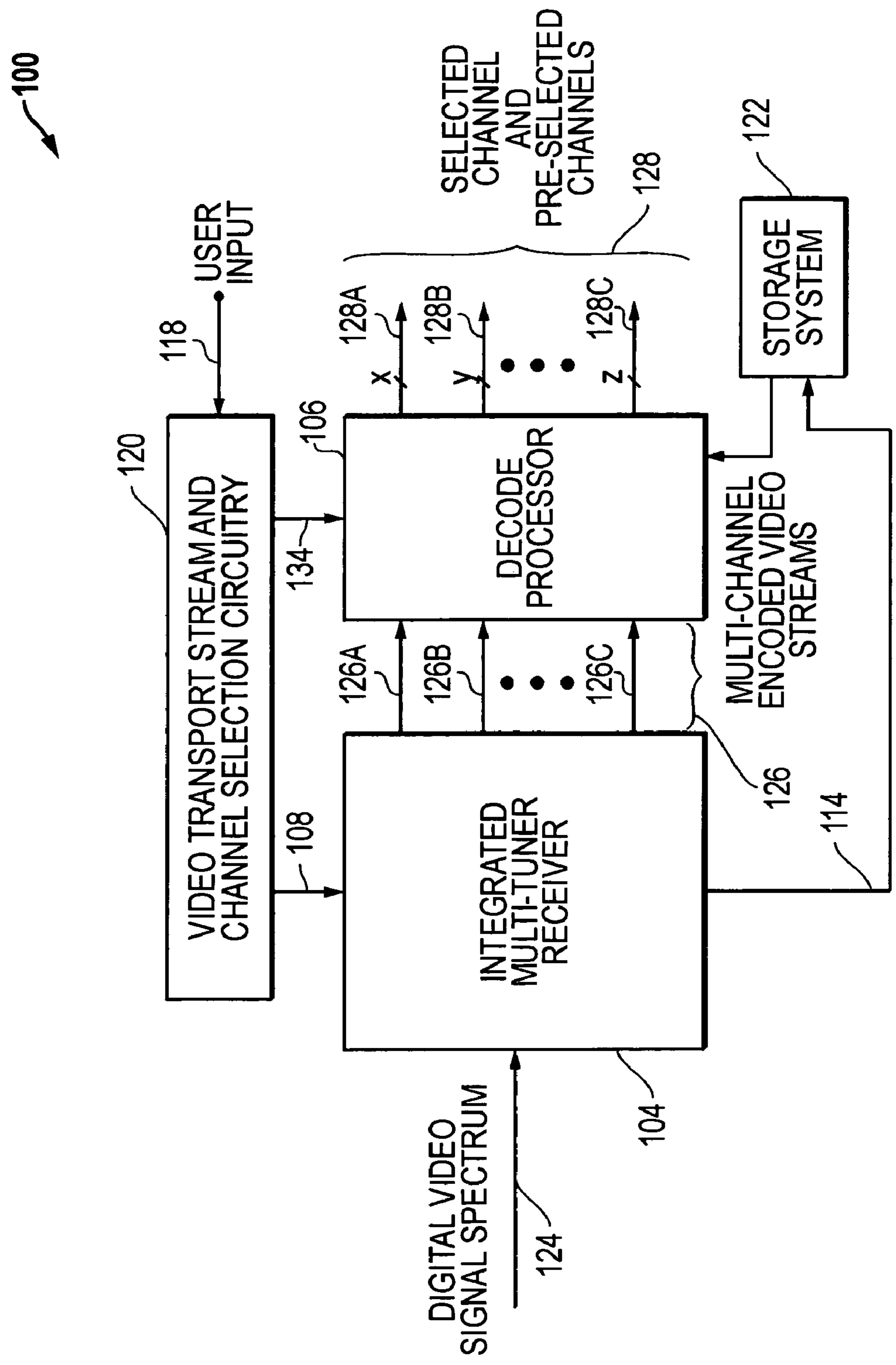
FIG. 1 is a block diagram for a receiver system including an integrated multi-tuner receiver, a decode processor and video stream and channel selection circuitry.

FIG. 1 is a block diagram for a multi-tuner selection system 100 having an integrated multi-tuner receiver 104, a decode processor 106 and video transport stream and channel selection circuitry 120. The integrated multi-tuner receiver 104 receives a channel spectrum signal 124 and outputs a plurality of digital transport streams represented by signals 126A, 126B . . . 126C. Multiple tuners and one or more demodulators inside the multi-tuner receiver circuitry 104 are used to generate these separately tuned transport streams that make up the output signals 126A, 126B . . . 126C. These output signals 126A, 126B . . . 126C are then processed by decode processor 106 to produce a plurality of decoded digital video streams that are represented by signals 128 (i.e., combination of signals 128A, 128B . . . 128C). These digital video streams include the currently selected program channel and a plurality of other program channels. Video stream selection circuitry can then be used to select one or more of these decoded digital video streams to output for viewing through a display device such as a television.

As discussed above, each of the digital transport streams 126A, 126B . . . 126C will typically include a plurality of multiplexed channels. As depicted in FIG. 1, the output signals 128A represent the possible decoding of X different digital video streams from the digital transport stream 126A. The output signals 128B represent the possible decoding of Y different digital video streams from the digital transport stream 126A. And the output signals 128C represent the possible decoding of Z different digital video streams from the digital transport stream 126C.

It is noted that the digital video signal spectrum 124 can be any signal that includes a plurality of different program information streams that can be separately tuned and/or demodulated. With respect to the satellite environment discussed above, the digital video signal spectrum 124 includes a plurality of transponder channels as discussed above. Cable digital video broadcasts and terrestrial digital video broadcasts could also provide the channel signal spectrum 124. Other signals that include digital video streams could also be used, as desired, such as digital video broadcasts over DSL (ADSL, SDSL, etc.) connections, digital video broadcasts over cable modem connections and digital video broadcasts over broadband Internet connections. It is expected, however, that the multi-channel encoded video streams 126 output to the decode processor 106 would be digital video transport streams compressed with a compression algorithm such as the one defined by the MPEG2 standard. In such compression schemes, as discussed above, an initialization frame (I-frame) is followed by a plurality of difference frames (B-frames), and this data structure is repeated over time. As stated above, one goal of the present invention is to reduce the time delay a user experiences when changing to a channel where B-frames are being received.

The video transport stream and channel selection control circuitry 120 provides control signals 108 to the integrated multi-tuner receiver 104. These signals 108 determine which digital transport streams 126 are output to the decode processor 106. The video transport stream and channel selection control circuitry 120 also provides control signals 134 to the decode processor 106. These signals 106 determine which channels 128 are output by the decode processor 106. The video transport stream and channel selection control circuitry 120 also receives one or more signals 118 representing user input. User input signals 118, for example, can be provided through a TV remote control device. Through the control signals 108 and 134, the video transport stream and channel selection control circuitry 120 can identify which digital transport streams and which program channels are processed by integrated multi-tuner receiver 104 and decode processor 106. As discussed further below, a wide variety of information and algorithms can be used to identify the transport streams and channels to be selected. By selecting channels in addition to the ones currently being viewed and using additional tuners to pre-tune these selected channels, the present invention helps reduce the time required to present a complete video image.

To further enhance the operation of this selection of channels to be tuned, a storage system 122, including one or more storage devices, can be used to store the compressed digital video data streams from the multi-tuner receiver circuitry. In such an embodiment, output signals 114 for one or more of the transport streams 126 can be sent to the storage system 122. The storage system 122 can then store, for example, the last X seconds of the compressed video data streams for the selected channels within the transport streams. The value for X can be selected, if desired, to cover at least the last initialization frame (I-frame) and related difference frames (B-frames). The output 116 of the storage system 122 can then be provided to the decode processor 106.

It is noted that the compressed digital video data streams 114 can also be used as part of a personal video recorder (PVR) or digital video recorder (DVR) systems. DVR and PVR systems are common names for referring to the storage of digital data streams for later viewing by the user. These systems are typically used to store television shows or movies so that they can be viewed at some later date and provide convenient mechanisms for storing digital video streams. With respect to the present invention, however, the compressed digital video data streams 114 are further used to reduce the time delay experienced by a user when changing between channels. It is further noted that the outputs 128 from the decode processor 106 can also be used for picture-in-picture (PiP) functionality, if desired.

It is noted that the multi-tuner receiver 104 could be implemented as a non-integrated design if desired. However, integration of these tuners may provide for more cost effective solutions. Example embodiments for integrated multi-tuner receiver architectures are described in the co-pending application Ser. No. 10/412,871, which was filed Apr. 14, 2003, and is entitled "Integrated Multi-Tuner Satellite Receiver Architecture and Associated Method," and the co-pending application Ser. No. 10/456,215, which was filed Jun. 6, 2003, and is entitled "Multi-Tuner Integrated Circuit Architecture Utilizing Frequency Isolated Local Oscillators and Associated Method," which are each hereby incorporated by reference in its entirety. In addition, it is noted that the decode processor 106 could be integrated with the multi-tuner receiver circuitry, if desired.

The video transport stream and channel selection circuitry 120, as discussed above, provides control signals 108 and 134 that help determine which transport streams and channels are selected by the system 100. In determining which transport streams to tune and which channels to decode, the selection circuitry 120 advantageously analyzes the nature of the transport streams to determine which channels are multiplexed together. The selection circuitry 120 can then utilize a wide variety of parameters to determine which transport streams should be output by the multi-tuner receiver 104 and ultimately which channels should be selected for decoding by the decode processor 106. For its operation, if desired, the selection circuitry 120 can utilize memory that stores information utilized in making transport stream and channel selection determinations. In addition, the selection circuitry 120 can receive externally generated data through a communication interface, for example, from a user and/or from an external initialization procedure that loads configuration data into on-chip registers or memory for later use.

As stated above, the selection circuitry 120 can be configured to utilize a wide variety of techniques and algorithms to determine or predict the transport streams and the channels to be selected. This prediction can be based upon definite information and/or speculative information. For example, predicted channels for selection can be based upon user selections or preferences such as where a user inputs to the system what specific channels the user wants selected or what types of channels the user would like selected (e.g., sports, cooking, history, etc.). Selection channels can also be based upon a wide variety of predictive algorithms, such as where prior user history of channel changing patterns can be used or where a determination is made of whether the user is consistently changing up or down one channel at a time. It is further noted that these algorithms could be based upon the current user, such that a user, for example, could identify him or her using the TV remote and that user's preferences are then utilized for transport stream and channel selection. In this way, the selection processing can be customized for each potential user. In addition, as advantageously utilized by the present invention, an analysis is made of which channels are multiplexed together at any given time to determine which transport streams provide the optimal combination of multiplexed channels. In short, a wide variety of information and algorithms could be used with respect to the selection circuitry 120 in determining what transport streams and what channels should be selected.

Figure 2:
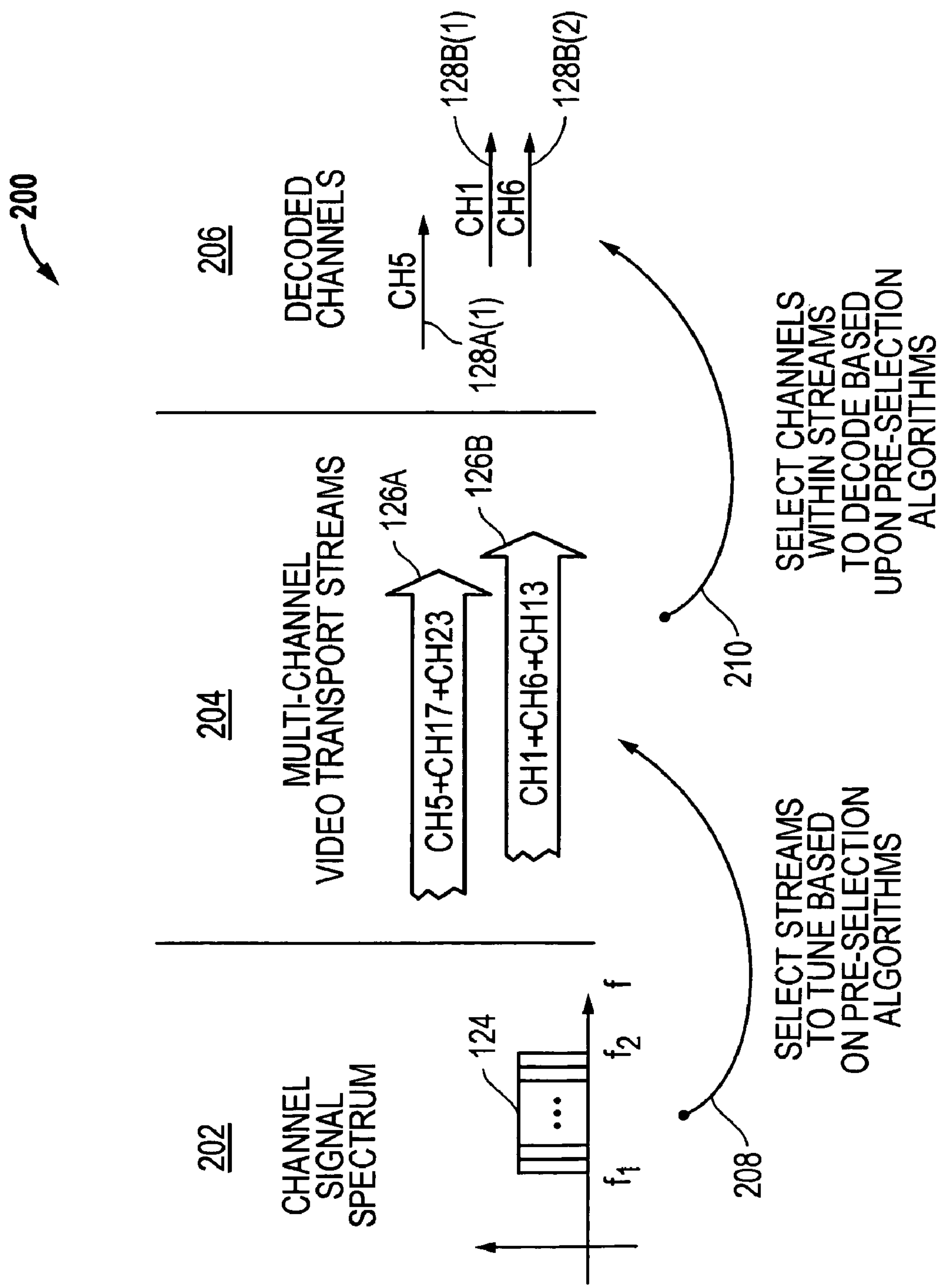
FIG. 2 is a signal flow diagram for selecting multiple digital video transport streams from a channel signal spectrum and for selecting channels from the channels multiplexed within those digital video transport streams.

FIG. 2 is a signal flow diagram for an example embodiment 200 for selecting multiple digital video transport streams from a channel signal spectrum and for selecting program channels from the channels multiplexed within those digital video transport streams. Initially, stage 202 represents the processing stage where a channel signal spectrum 124 is received by multi-tuner receiver 104. As depicted in FIG. 2, this signal spectrum 124 includes a plurality of channels spaced between a low frequency ($f_1$) and a high frequency ($f_2$). As discussed above, it is expected that each of the channels will include at least one digital video transport stream, and each digital video transport stream will in turn include data representing a plurality of program channels. Arrow 208 represents the process step of selecting the transport streams to tune using the multi-tuner receiver 104. Stage 204 represents the processing stage where a plurality of multi-channel video transport streams are received by the decode processor 106. In the embodiment depicted, transport streams 126A and 126B have been selected for tuning and are being provided to decode processor 106. For the embodiment depicted, transport stream 126A includes data for video channels 5, 17 and 23 and transport stream 126B includes data for channels video 1, 6 and 13.

It is noted that these channels have been selected for example purposes only. The actually channel combinations would likely be determined by the digital video broadcaster, as discussed above. As also discussed above, the selection circuitry 120 analyzes which channels have been multiplexed together to determine which transport streams should be selected for tuning. It is further noted that each transport stream could include fewer or greater numbers of channels than three and that three channels for each transport stream was selected merely as an example. Advantageously, as recognized and utilized by the present invention, in addition to utilizing predictive channel selection algorithms, the number and nature of the channels available for pre-processing can be efficiently selected by considering what channels have been multiplexed together in the transport streams. Finally, it is noted that one of the selected transport streams would likely include the channel currently selected by the user; however, it is possible for there not to be a currently selected channel that is being viewed, such as where a user is watching a previously recorded program.

Arrow 210 represents the process step of selecting which channels within the tuned transport streams to decode based upon selection algorithms being utilized by selection circuitry 120. Stage 206 represents the processing stage where a plurality of channels have been decoded using the decode processor 106. In the embodiment depicted, channel 1 (CH1) and channel 6 (CH6) have been decoded from transport stream 126B, as represented by element numbers 126B(1) and 126B(2), respectively. And channel 5 (CH5) has been decoded form the transport stream 126A, as represented by element number 126A(1). As discussed above, this selection of which channels to decode from the available channels within the tuned transport streams is based upon the selection algorithms utilized by selection circuitry 120 and the processing power available in the decode processor 106. And, as noted above, a wide variety of predictive algorithms and considerations may be utilized in implementing these algorithms for determining which channels to decode.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for selecting transport streams and program channels to reduce delay in resolving digital video images while channel changing, comprising:

receiving a channel signal spectrum including a plurality of digital video transport streams, each transport stream comprising a plurality of program channels;

tuning a first digital video transport stream that includes a current program channel;

selecting one or more additional digital video transport streams to tune based at least in part upon predictive channel selection and based at least in part upon which predicted program channels are multiplexed together in the transport streams such that the selected transport streams provide a desirable combination of multiplexed program channels with respect to the predicted program channels;

tuning the one or more selected additional digital video transport streams; and utilizing a plurality of program channels within the first digital video transport stream and within the one or more additional digital video transport streams to help reduce delay time in channel-changing.

2. The method of claim 1, wherein the tuning steps are performed utilizing a plurality of tuners integrated on the same integrated circuit.

3. The method of claim 2, further comprising decoding a plurality of program channels from each digital video transport stream to produce a plurality of video streams.

4. The method of claim 3, wherein the decoding step is performed with a decode processor integrated on the same circuit as the plurality of tuners.

5. The method of claim 1, wherein the predictive channel selection comprises predicting what channel will be selected next.

6. The method of claim 5, wherein the predicting step comprises analyzing a user's channel changing activities to determine if the user is moving sequentially up or sequentially down in program channels.

7. The method of claim 5, wherein the predicting step comprises receiving user input concerning program channels to be selected.

8. The method of claim 5, wherein the predicting step comprises storing historical information concerning channel changing patterns and using the historical information in determining channels to be pre-selected.

9. The method of claim 1, further comprising storing at least a portion of the digital video transport streams in a storage system.

10. The method of claim 1, wherein the digital video transport streams include MPEG2 compression.

11. The method of claim 1, wherein the channel signal spectrum comprises a satellite digital video broadcast, a cable digital video broadcast, a terrestrial digital video broadcast, video broadcast over DSL, video broadcast over cable modem or video broadcast over broadband Internet.

12. A multiple tuner receiver system including transport stream and channel selection circuitry for helping reduce delay time in channel-changing, comprising:

a first receiver including a tuner, the first receiver configured to have a channel signal spectrum as an input and to have a first digital video transport stream as an output, the channel signal spectrum including a plurality of program channels;

at least one additional receiver including a tuner, the additional receiver configured to have the channel signal spectrum as an input and to have a second digital video transport stream as an output; and transport stream and channel selection circuitry configured to provide a first control signal to the first receiver indicating a first transport stream to be tuned and configured to provide at least one additional control signal to each additional receiver indicating at least one additional transport stream to be tuned, the additional transport streams being selected based at least in part upon predictive channel selection and based at least in part upon which predicted program channels are multiplexed together in the transport streams such that the selected transport streams provide a desirable combination of multiplexed program channels with respect to the predicted program channels.

13. The multiple tuner receiver system of claim 12, wherein the tuners are integrated on the same integrated circuit.

14. The multiple tuner receiver system of claim 13, further comprising a decode processor configured to process the transport streams and to output a plurality of program channels from the transport streams.

15. The multiple tuner receiver system of claim 14, wherein the decode processor outputs a plurality of program channels from each transport stream to produce a plurality of video streams.

16. The multiple tuner receiver system of claim 15, wherein the decode processor is integrated on the same circuit as the tuners.

17. The multiple tuner receiver system of claim 12, wherein the predictive channel selection comprises a prediction of what channel will be selected next.

18. The multiple tuner receiver system of claim 12, further comprising a storage system configured to store at least a portion of the digital video transport streams.

19. The multiple tuner receiver system of claim 12, wherein the digital video transport streams include MPEG2 compression.

20. The multiple tuner receiver system of claim 12, wherein the channel signal spectrum comprises a satellite digital video broadcast, a cable digital video broadcast, a terrestrial digital video broadcast, video broadcast over DSL, video broadcast over cable modem or video broadcast over broadband Internet.

* * * * *